United States Patent
Fribus et al.

(10) Patent No.: US 10,670,140 B2
(45) Date of Patent: Jun. 2, 2020

(54) APPARATUS FOR SHIFTING IN AN AUTOMOBILE

(71) Applicant: ZF Friedrichshafen AG, Friedrichshafen (DE)

(72) Inventors: Vitali Fribus, Quakenbrück (DE); Alex Hessel, Lemförde (DE)

(73) Assignee: ZF FRIEDRICHSCHAFEN AG, Friedrichshafen (DE)

( * ) Notice: Subject to any disclaimer, the term of this patent is extended or adjusted under 35 U.S.C. 154(b) by 0 days.

(21) Appl. No.: 16/067,734

(22) PCT Filed: Dec. 8, 2016

(86) PCT No.: PCT/EP2016/080199
§ 371 (c)(1),
(2) Date: Jul. 2, 2018

(87) PCT Pub. No.: WO2017/125200
PCT Pub. Date: Jul. 27, 2017

(65) Prior Publication Data
US 2019/0011042 A1 Jan. 10, 2019

(30) Foreign Application Priority Data
Jan. 5, 2016 (DE) .................... 10 2016 200 022

(51) Int. Cl.
*F16H 59/12* (2006.01)
*G06F 3/0488* (2013.01)
(Continued)

(52) U.S. Cl.
CPC ............. *F16H 59/12* (2013.01); *B60K 35/00* (2013.01); *B60K 37/06* (2013.01); *B62D 1/046* (2013.01);
(Continued)

(58) Field of Classification Search
None
See application file for complete search history.

(56) References Cited

U.S. PATENT DOCUMENTS 7,920,126 B2 4/2011 Prados et al.
8,843,268 B2 9/2014 Lathrop et al.
(Continued)

FOREIGN PATENT DOCUMENTS

DE 10 2005 038 161 A1 7/2006
DE 10 2010 005 483 A1 8/2010
(Continued)

OTHER PUBLICATIONS

German Office Action in priority application DE 10 2016 200 022.5 dated Oct. 24, 2016, in German Language, 10p (including English language translation of p. 8).
(Continued)

*Primary Examiner* — Duane N Taylor, Jr.
(74) *Attorney, Agent, or Firm* — Brinks Gilson & Lione

(57) ABSTRACT

The disclosure relates to an apparatus for a shift by wire assembly in an automobile comprising a touch sensitive display for selecting an operation mode of an automatic and/or automatized transmission of the automobile, wherein the touch sensitive display is configured to detect a touch gesture of an operator corresponding to the selection of the operation mode, wherein the apparatus further comprises an actuator that serves to control the touch sensitive display such that when the actuator is actuated, the touch sensitive display is configured to display a graphical, interactive user-interface selection menu on which the operator can perform the touch gesture.

14 Claims, 2 Drawing Sheets

Figure 1A:
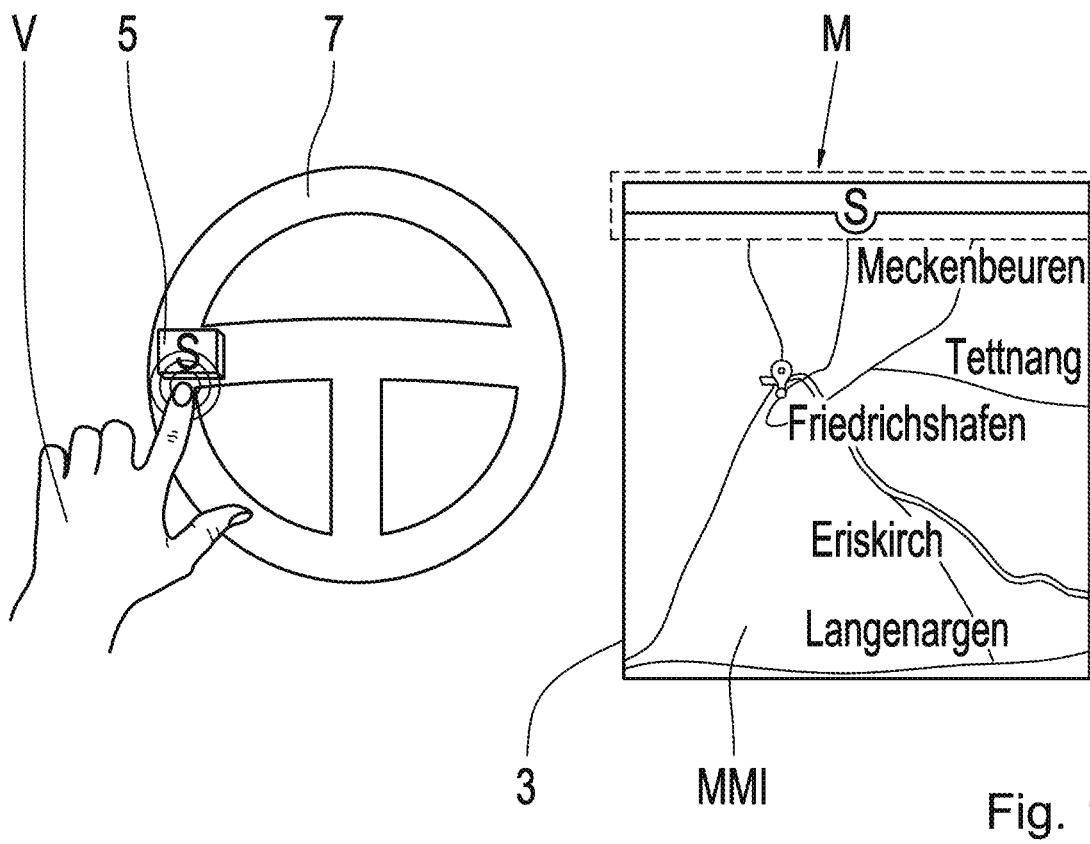

(51) Int. Cl.
*G06F 3/0486* (2013.01)
*B60K 35/00* (2006.01)
*B60K 37/06* (2006.01)
*B62D 1/04* (2006.01)

(52) U.S. Cl.
CPC .......... *G06F 3/0486* (2013.01); *G06F 3/0488* (2013.01); *G06F 3/04886* (2013.01); *B60K 2370/11* (2019.05); *B60K 2370/146* (2019.05); *B60K 2370/1446* (2019.05); *B60K 2370/55* (2019.05); *B60K 2370/782* (2019.05); *G06F 2203/014* (2013.01); *G06F 2203/04809* (2013.01)

(56) References Cited

U.S. PATENT DOCUMENTS

| | | | |
|---|---|---|---|
| 2010/0222972 A1* | 9/2010 | Hustyi | F16H 59/02 |
| | | | 701/53 |
| 2012/0041655 A1 | 2/2012 | Thooris | |
| 2012/0096979 A1 | 4/2012 | Trujillo Linke | |
| 2014/0020496 A1* | 1/2014 | Heo | F16H 59/044 |
| | | | 74/473.12 |

FOREIGN PATENT DOCUMENTS

| | | |
|---|---|---|
| DE | 10 2012 007 434 A1 | 5/2013 |
| DE | 10 2013 221 895 A1 | 5/2014 |
| JP | 2015-150063 A | 8/2015 |
| WO | WO 2015/067266 A1 | 5/2015 |

OTHER PUBLICATIONS

International Search Report for PCT/EP2016/080199, dated Feb. 15, 2017, 4p, in English.

Written Opinion of the International Searching Authority for PCT/EP2016/080199, dated Feb. 15, 2017, 6p, in English.

* cited by examiner

APPARATUS FOR SHIFTING IN AN AUTOMOBILE

This application is a filing under 35 U.S.C. § 371 of International Patent Application PCT/EP2016/080199, filed Dec. 8, 2016, and claims the priority of DE 10 2016 200 022.5, filed Jan. 5, 2016. These applications are incorporated by reference herein in their entirety.

The disclosure relates to an apparatus for a shift by wire assembly in an automobile comprising a touch sensitive display for selecting an operation mode of an automatic and/or automatized transmission of the automobile, wherein the touch sensitive display is configured to detect a touch gesture of an operator corresponding to the selection of the operation mode. Such operating devices generally comprise a communication interface, one or more processors, memory and one or more programs, wherein the one or more programs are stored in the memory and configured to be executed by the one or more processors, said programs including instructions for detecting contact with the touch sensitive display, in particular touch gestures of an operator of the automobile, and outputting an operation mode selection signal via the communication interface when said contact corresponds to a predefined touch gesture for selecting one of the said operation modes.

An apparatus having a touch sensitive display is disclosed in the U.S. Patent Application Publication US2012/0041655A1, wherein it is disclosed that a vector defined by two coordinates resulting from a digital pressure applied by an operator of an automobile is compared to predetermined requirements on the length and orientation of the vector for validating a desired command for selecting an operating mode of the an automobile.

Touch sensitive displays for applications in automobiles as multimedia interfaces, for example, are also generally known in the art. The German patent publication DE102010005483A1, for example, discloses an automobile with a steering wheel, wherein two spatially separated touch sensitive displays are arranged on the steering wheel for displaying various sorts of information and for inputting commands to control infotainment, navigation and air conditioning functions of the automobile.

In this context, the object of the disclosure is to suggest an apparatus for changing transmission modes in an automobile that enables simple and error free operation.

The object of the disclosure is achieved with the subject matter of independent claim 1. The dependent claims describe preferred embodiments of the disclosure.

The object of the disclosure, then, is achieved with an apparatus for a shift by wire assembly in an automobile comprising a touch sensitive display for selecting an operation mode of an automatic and/or automatized transmission of the automobile, wherein the touch sensitive display is configured to detect a touch gesture of an operator corresponding to the selection of the operation mode wherein the apparatus further comprises an actuator that serves to control the touch sensitive display such that when the actuator is actuated, the touch sensitive display is configured to display a graphical, interactive user-interface selection menu on which the operator can perform the touch gesture. Since the touch sensitive display only displays the selection menu when the actuator has been activated, the chance of an inadvertent selection of an operation mode through accidental contact with the touch sensitive display is greatly reduced and the overall safety of the automobile is increased.

The touch sensitive display could, for example, be an organic light emitting diode display with an integrated touch sensor system, molded together through a process involving film-insert-molded electronics for example. Alternatively, the touch sensitive display can comprise a rear projection polycarbonate film with an integrated and/or attached touch sensor system. The touch sensitive display can also be, for example, a liquid crystal display or thin film transistor display having integrated touch sensors.

In an further development of the inventive apparatus the graphical, interactive user-interface selection menu designates at least two selection areas on the surface of the touch sensitive display, said selection areas being spatially separated from each other, and in that the touch sensitive display is configured to detect a pressure within the areas corresponding to the touch gesture of the operator for selecting one of at least two operation modes. In other words, the selection menu can comprise graphical user interface objects corresponding to touch buttons, and the touch gesture of the operator corresponds to applying a pressure to or making contact with one of the areas of the touch sensitive display in which the touch buttons are displayed.

In an advantageous embodiment of the disclosure the actuator is embodied as a toggle switch and/or push button. Such a toggle switch and/or push button are a reliable and cost effective actuators, which can be electrically or electronically connected with an evaluation unit that is likewise connected to or comprised by the touch sensitive display.

In an embodiment of the inventive apparatus the actuator is located on a steering wheel of the automobile.

In another embodiment of the inventive apparatus the actuator is embodied as a foot pedal. The actuator can therefore be actuated by a foot of the operator when the operator is seated in the automobile in an operator's seat. This embodiment has the special advantage that it leaves at least one hand of the operator free at all times to maintain control of the steering wheel. Furthermore, for operators, i.e. drivers, that are used to operating a manual selection apparatus, the actuator as a foot pedal can be operated in an intuitive way, since such drivers are accustomed to actuating a clutch of the automobile when selecting a gear, i.e. an operation mode of the automobile.

In an embodiment of the apparatus the touch sensitive display is embodied as a multimedia interface in a middle console of the automobile. Since the time required to select an operation mode of the automobile only comprises a small portion of a typical journey in an automobile, the normal use of a multimedia interface would hardly be affected by the added functionality envisioned according the disclosure. Furthermore, installation and material costs can be reduced through redundant use of the components.

In an embodiment of the disclosure the touch sensitive display is located on the steering wheel of the automobile.

In an alternative embodiment of the inventive apparatus the touch sensitive display is configured to display the graphical, interactive user-interface selection menu as a shift pattern, and is further configured to display an image, which is a graphical, interactive user-interface object, which can be moved within the shift pattern according to the touch gesture of the operator for selecting the operation mode.

Figure 2:
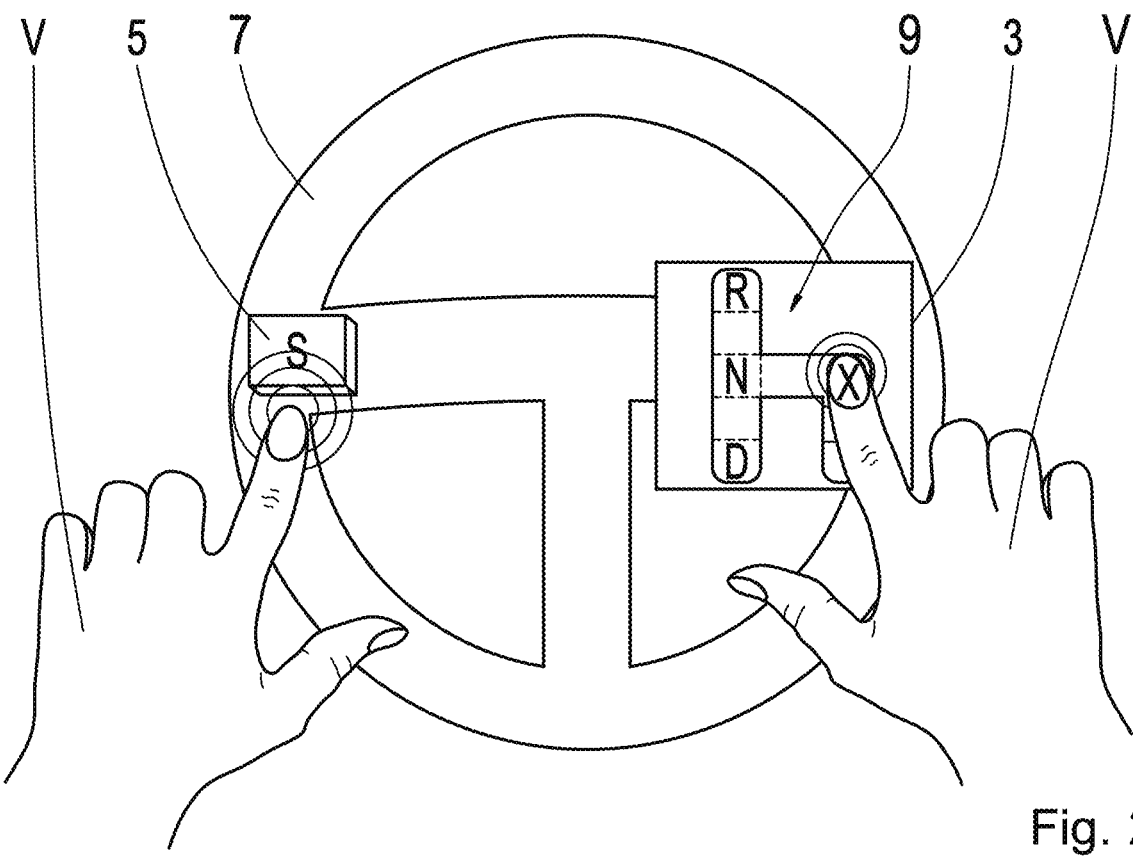
Figure 3:
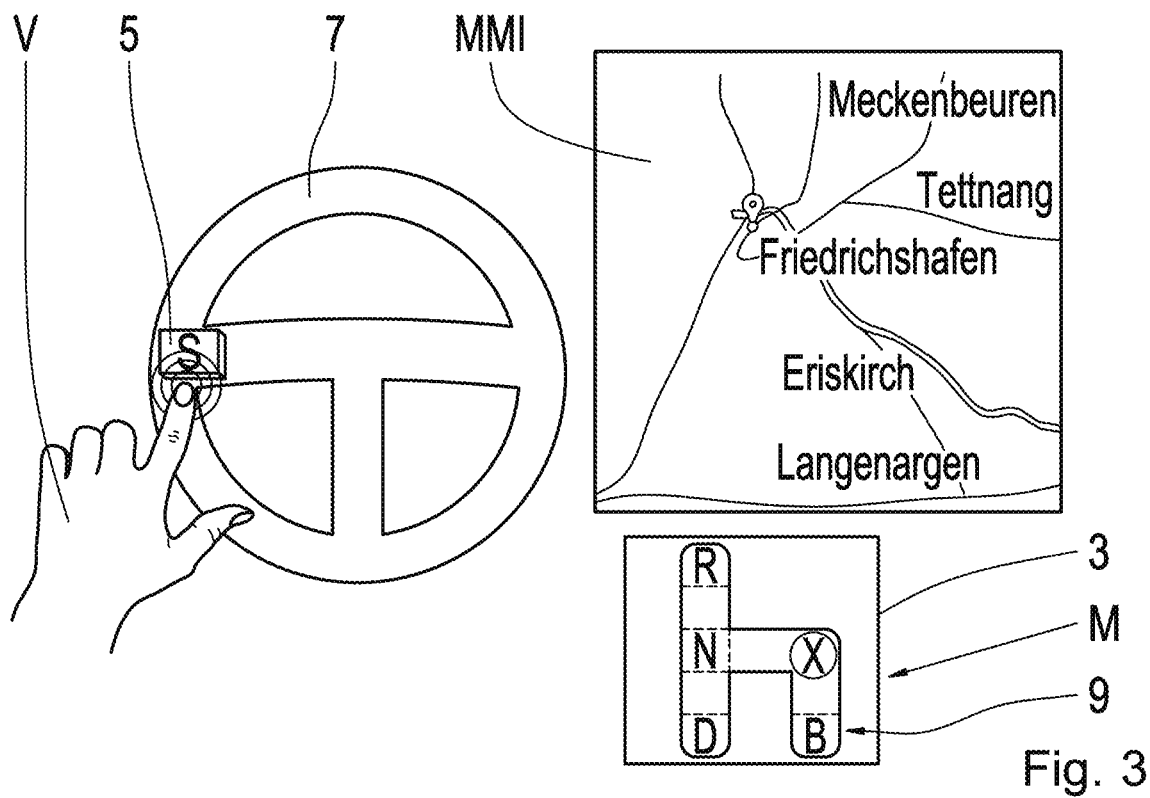

Certain embodiments of the disclosure will next be explained in detail with reference to the following figures. They show:

FIGS. 1a, b: a schematic representation of an embodiment of the disclosure;

FIG. 2: a schematic representation of an alternative embodiment of the disclosure; and FIG. 3: a schematic representation of a further alternative embodiment of the disclosure.

FIG. 1a shows a schematic representation of an embodiment of the disclosure in which an actuator 5 is provided on a steering wheel 7 of an automobile. The actuator 5 is a push button 5 arranged on a side of the steering wheel 7 facing the operator V of the automobile. FIG. 1a furthermore shows a touch sensitive display 3 of a multimedia interface MMI, which is situated on the center console of the automobile. The touch sensitive display 3 is displaying navigational information. At the top of the touch sensitive display 3 a gray stripe representing the border of a drop down selection menu M is shown. The drop down selection menu M is hidden from view because the operator V is not actuating the actuator 5, that is, the operator V is not pressing the push button 5.

Figure 1B:
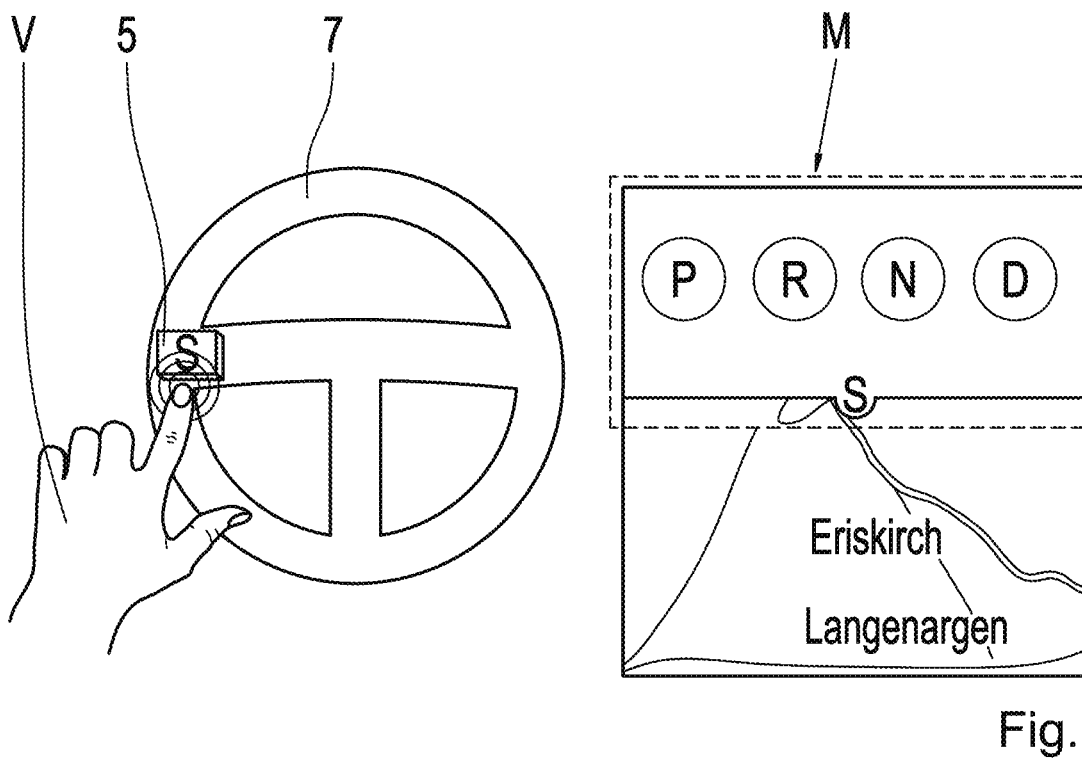

In FIG. 1b the operator V has actuated the actuator 5, that is, pressed the button 5 arranged on the steering wheel 7, and the touch sensitive display 3 has correspondingly displayed the selection menu M, in the form of a drop down menu M. The selection menu M comprises four areas designated for selecting operation modes P, R, N, D of the automobile. Only when the operator V is actively actuating the actuator 5 does he or she have the opportunity to select an operation mode P, R, N, D of the automobile.

FIG. 2 shows a schematic representation of an alternative embodiment of the disclosure, in which a touch sensitive display 3 is arranged on a side of the steering wheel 7 facing the operator V. The operator V has pressed the actuator 5 such that a selection menu M comprising a shift pattern 9 is displayed on the touch sensitive display 3. The operator V can perform a touch gesture for selecting an operating state P, R, N, D of the automobile by interacting with an image X displayed in the shift pattern 9.

FIG. 3 shows a schematic representation of a further alternative embodiment of the disclosure, in which the actuator 5 is arranged on the steering wheel 7 of the automobile, and an additional touch sensitive display 3 is provided in the middle console of the automobile in addition to a multimedia interface MMI. As in FIG. 2, the operator V has actuated the actuator 5 by pressing the button on the steering wheel 7 and the touch sensitive display 3 has displayed a selection menu M comprising a shift pattern 9. At the same time, the multimedia interface MMI is displaying navigational information.

REFERENCE CHARACTERS

3 Touch sensitive display
5 Actuator
7 Steering wheel
9 Shift pattern
M Selection menu
V Operator
P Park operation mode
R Reverse operation mode
N Neutral operation mode
D Drive operation mode
MMI Multimedia interface
X Image

The invention claimed is:

1. An apparatus for a shift by wire assembly in an automobile comprising:
a touch sensitive display for selecting an operation mode of the automobile, wherein the touch sensitive display is configured to detect a touch gesture of an operator corresponding to the selection of the operation mode, and wherein the touch sensitive display is a multimedia interface in a center console of the automobile; and
an actuator located on a steering wheel of the automobile and configured to control the touch sensitive display such that when the actuator is actuated, the touch sensitive display is configured to display a graphical, interactive user-interface selection menu on which the operator can perform the touch gesture;
wherein the graphical, interactive user-interface selection menu is at least partially hidden from view of the operator when the actuator is not being actively actuated,
and wherein the graphical, interactive user-interface selection menu is displayed only while the actuator is being actively actuated.

2. The apparatus according to claim 1, wherein the graphical, interactive user-interface selection menu includes at least two selection areas on the surface of the touch sensitive display, said selection areas being spatially separated from each other, and the touch sensitive display is configured to detect a pressure within the selection areas corresponding to the touch gesture of the operator for selecting one of at least two operation modes.

3. The apparatus according to claim 1, wherein the actuator is a toggle switch.

4. The apparatus according to claim 1, wherein the touch sensitive display is configured to display the graphical, interactive user-interface selection menu as a shift pattern, and is further configured to display an image, which is a graphical, interactive user-interface object, which can be moved within the shift pattern according to the touch gesture of the operator for selecting the operation mode.

5. The apparatus according to claim 1, wherein the actuator is a push button.

6. The apparatus according to claim 2, wherein the at least two selection areas are touch buttons.

7. The apparatus according to claim 1, wherein the graphical, interactive user-interface selection menu is a drop down menu that descends from a top region of the touch sensitive display when the actuator is actuated.

8. The apparatus according to claim 7, wherein the graphical, interactive user-interface selection menu is displayed as a stripe at the top region of the touch sensitive display when the actuator is not actuated.

9. The apparatus according to claim 1, wherein the graphical, interactive user-interface selection menu at least partially covers information displayed on the touch sensitive display before the actuator was actuated.

10. The apparatus according to claim 9, wherein the information displayed on the touch sensitive display before the actuator was actuated comprises navigational information.

11. The apparatus according to claim 1, wherein the touch sensitive display comprises an organic light emitting diode display with an integrated touch sensor system, molded together through a process involving film-insert-molded electronics.

12. The apparatus according to claim 1, wherein the touch sensitive display comprises a rear projection polycarbonate film with an integrated and/or attached touch sensor system.

13. The apparatus according to claim 1, wherein the touch sensitive display comprises a liquid crystal display having integrated touch sensors.

14. The apparatus according to claim 1, wherein the touch sensitive display comprises a thin film transistor display having integrated touch sensors.

* * * * *